United States Patent
Sachdev et al.

(10) Patent No.: US 7,964,542 B2
(45) Date of Patent: Jun. 21, 2011

(54) ENHANCED THERMO-OXIDATIVE STABILITY THERMAL INTERFACE COMPOSITIONS AND USE THEREOF IN MICROELECTRONICS ASSEMBLY

(75) Inventors: Krishna G. Sachdev, Hopewell Junction, NY (US); Harbans Singh Sachdev, legal representative, Hopewell Junction, NY (US); Mark S. Chace, Beacon, NY (US); Normand Cote, Canton de Granby (CA); David L. Gardell, Fairfax, VT (US); Jeffrey D. Gelorme, Burlington, CT (US); Sushumna Iruvanti, Wappingers Falls, NY (US); G. John Lawson, Barre, VT (US); Tuknekah M. Noble, Hanover, NH (US)

(73) Assignee: International Business Machines Corporation, Armonk, NY (US)

( * ) Notice: Subject to any disclaimer, the term of this patent is extended or adjusted under 35 U.S.C. 154(b) by 1049 days.

(21) Appl. No.: 11/330,922

(22) Filed: Jan. 12, 2006

(65) Prior Publication Data
US 2007/0161521 A1 Jul. 12, 2007

(51) Int. Cl.
*C10M 141/10* (2006.01)
*C10M 137/04* (2006.01)
*C10M 129/68* (2006.01)

(52) U.S. Cl. ........ 508/441; 508/442; 508/478; 508/563; 508/585; 508/591

(58) Field of Classification Search ................. 508/441, 508/442, 463, 465, 501, 502, 505, 506, 510, 508/526, 532, 564, 579, 583, 584; 324/756; 252/70, 71, 73, 79; 165/104.11, 104.19
See application file for complete search history.

(56) References Cited

U.S. PATENT DOCUMENTS

| | | | |
|---|---|---|---|
| 4,724,247 A | 2/1988 | Burton et al. | |
| 4,954,548 A * | 9/1990 | Klingensmith | 524/258 |
| 5,094,769 A * | 3/1992 | Anderson, Jr. et al. | 252/71 |
| 5,918,665 A | 7/1999 | Babcock et al. | |
| 6,121,209 A * | 9/2000 | Watts et al. | 508/162 |
| 6,577,146 B2 | 6/2003 | Gamache et al. | |
| 6,770,693 B2 * | 8/2004 | Stein et al. | 524/128 |
| 6,872,682 B1 | 3/2005 | Alastalo et al. | |
| 2004/0159654 A1 * | 8/2004 | Ryan et al. | 219/634 |

* cited by examiner

*Primary Examiner* — Ellen M McAvoy
*Assistant Examiner* — Taiwo Oladapo
(74) *Attorney, Agent, or Firm* — DeLio & Peterson, LLC; Kelly M Nowak; Joseph Petrokaitis

(57) ABSTRACT

Liquid compositions containing a specific hindered phenol or a hindered phenol in combination with an aromatic phosphite are provided which are used as a thermal interface between a heatsink and a chip during a test procedure for electronic components which compositions enhance the thermal conductivity between the heatsink and the chip, are easily removed from the heatsink and the chip after the test procedure without any deleterious residue and which allow the use of high temperatures for extended periods during the test procedure without any significant degradation of the composition. A method for using the compositions in electronic component test procedures such as burn-in procedures is also provided.

21 Claims, No Drawings

ENHANCED THERMO-OXIDATIVE STABILITY THERMAL INTERFACE COMPOSITIONS AND USE THEREOF IN MICROELECTRONICS ASSEMBLY

BACKGROUND OF THE INVENTION

1. Field of the Invention

The present invention relates generally to the testing of electronic components such as chips for functional reliability prior to assembly by procedures such as burn-in procedures and, in particular, to liquid compositions which are used as a thermal interface between a heatsink and a chip during the test procedure which compositions enhance the thermal conductivity between the heat sink and the chip, are easily removed from the heat sink and the chip after the test procedure without any deleterious residue and which allow the use of high temperatures for extended periods during the test procedure without any significant degradation of the composition and to a method for using the compositions in electronic component test procedures.

2. Background of the Invention

Due to the complexity of high performance MCMs fabrication processes using high power devices, it is important to pretest the device performance for functional reliability prior to assembly in order to eliminate/minimize module rework and reduce overall product production cost. Test and Burn-in processes for high density device chips require extended Test/Burn-in duration at relatively high temperature to evaluate and assure long term reliability of device performance.

One of the commonly used methods for Known Good Die testing (KGD) for solder ball flip-chip interconnection is based on temporary chip attachment (TCA) which involves placing a heatsink on the back of the device mounted on the temporary chip carrier with a cooling medium or thermal interface material interposed between the heatsink and the silicon chip for effective heat dissipation during extended Burn-in.

U.S. Pat. Nos. 5,918,665 and 6,577,146, which are incorporated herein by reference, disclose burn-in procedures for testing integrated circuit chip packages. As discussed in the patents, the thermal resistance between the chip surface and the heat sink surface is important to the reliability of the test procedure and it is typical to use a liquid film between the chip surface and the heat sink surface to improve the thermal conductivity between the mating faces. It is very important that the liquid film have a high conductivity and a high stability over an extended period of time at elevated temperatures, that the liquid not degrade significantly during the test procedure and that the liquid be easily removed from both surfaces after the test procedure is completed.

Several options for the cooling media are available with a range of properties to meet the functional requirement during test and burn-in which include low thermal resistance organic liquids, reworkable solid thermal interface, PCM, thermal grease, thermally conducive pads and tapes, etc. An important consideration for the thermal interface in the TCA method for KGD is its cleanability from the die backing and the heatsink after test and burn-in so as to obtain residue-free surfaces with no impact on the reuse performance of the heatsink and the follow-on device chip assembly process. To minimize manufacturing cost and down time, it is also required that heatsink cleaning frequency is kept to a minimum by continuing its use for multiple manufacturing Test/Burn-in cycles which of course would depend on the chemical stability of the thermal interface material.

With high circuit density devices requiring extended duration conditions, Liquid Thermal Interface (LTI) is preferred for maintaining close interfacial contact between the device chip and the heatsink which is critical for efficient heat dissipation from the device to the heatsink during Test/Burn-in program. For effective heat transfer from the device chip to the heatsink using LTI material, it is important that it has good wetting with the contacting surfaces so that a void-free interface is obtained. In the case of conductive filler carrying thermal interface materials such as thermal paste or greases, contact at the interface is subject to filler size in addition to the likelihood of particulates causing voids at the interface resulting in increase of interfacial resistance during Test/Burn-in process.

Among the various options for the Liquid Thermal Interface materials, Polyalphaolefin Oils (PAOs), are preferred thermal interface materials between electronic components such as high density Si device chips and high thermal conductivity metal heat sinks because of their highly desirable properties of high thermal conductivity (about 0.18 W/mK), lower thermal resistance than common liquids, availability in different viscosity grades with high purity, high thermal stability, low volatility, no significant health and safety or toxicity issues, and no environmental emission concerns. Other materials which are similar to PAOs may be used in the invention but PAOs are preferred because of their demonstrated effectiveness and the following description will be directed to these materials for convenience.

A commercial PAO composition uses PAO 100 which is formulated with Irganox 1010 antioxidant [tetrakis-(methylene-3,5 di-tert-butyl-4-hydroxy-hydrocinnamate)methane] as LTI for chips requiring relatively short duration Test/Burn-in, typically 24 hrs. at 120° C. and 140° C. However, for devices requiring high temperature extended duration conditions prior to assembly to meet the functional reliability requirement for present semiconductor product programs, the commercial fluid was found to be unacceptable for 144 hrs and longer at 140° C. This formulation is subject to thermo-oxidative chemical changes during extended exposure to air environment at these temperatures resulting in formation of reactive by-products including radicals, peroxides and hydroperoxides, which in turn polymerize and form non-removable deposits depleting the antioxidant and degrading the performance of the interface liquid. Apart from the problem of inadequate thermal cooling performance, the interfacial polymerization reaction products cause sticking of the heatsink with the chip, making it difficult to effectively clean the chip back side and the heatsink to obtain residue-free surfaces for follow-on processing.

SUMMARY OF THE INVENTION

Bearing in mind the problems and deficiencies of the prior art, it is therefore an object of the present invention to provide liquid compositions for use as a heat transfer interface in electronic component testing, such as burn-in testing, and microelectronic assembly, the compositions having enhanced thermo-oxidative stability for extended periods of time at elevated temperatures.

It is another object of the present invention to provide a method for testing an electronic device in microelectronic assembly process such as burn-in testing wherein the method may be used for extended periods of time at elevated temperatures without degradation of a liquid composition heat transfer interface between the electronic component being tested and a heatsink.

Still other objects and advantages of the invention will in part be obvious and will in part be apparent from the specification.

The above and other objects, which will be apparent to those skilled in art, are achieved in the present invention which is directed to a liquid composition for use as a heat transfer interface in electronic testing such as burn-in testing and microelectronic assembly, having an enhanced thermo-oxidative stability for extended periods at elevated temperatures comprising:

a liquid, preferably an oil, and most preferably a polyalphaolefin oil; and a stability enhancing amount up to about 2% or more, preferably about 0.16-0.4% by weight, of [1,3,5-trimethyl-2,4,6-tris(3,5-di-tert-butyl-4-hydroxybenzyl)benzene] (sold under the trademark Ethanox 330).

In another aspect of the invention the liquid composition comprises a hindered phenol antioxidant in combination with an aromatic phosphite antioxidant. In a preferred composition the hindered phenol is Irganox 1010 and/or Ethanox 330 and the phosphite is tris(2,4-di-tert-butyl phenyl)phosphite sold under the trademark Ethaphos 368.

In a further aspect of the invention the liquid composition of the invention comprises a hindered phenol antioxidant in combination with an aromatic phosphite antioxidant as described above and an aminic antioxidant such as dioctyl diphenylamine.

In another aspect of the invention a method is provided for testing an electronic device comprising the steps of:

providing an electronic component to be tested, the electronic component having a face;

providing a heatsink to dissipate heat away from the surface of an electronic component, the heatsink having a face which mates with the face of the electronic component;

providing a liquid composition between the mating surfaces comprising:

a liquid, preferably an oil, and most preferably a polyalphaolefin oil; and a stability enhancing amount of [1,3,5-trimethyl-2,4,6-tris(3,5-di-tert-butyl-4-hydroxybenzyl) benzene] (sold under the trademark Ethanox 330);

testing the mated electronic component by stimulating the electronic component for a predetermined period of time at a predetermined voltage; and separating the electronic component and heatsink after the test and removing the liquid thermal interface.

In another aspect of the invention the method comprises using a liquid composition comprising a hindered phenol antioxidant in combination with an aromatic phosphite antioxidant as described above.

In another aspect of the invention the method comprises using a liquid composition comprising a hindered phenol antioxidant in combination with an aromatic phosphite antioxidant and an aminic antioxidant as described above

DESCRIPTION OF THE PREFERRED EMBODIMENT(S)

This disclosure addresses the need for performance enhancement of Thermal Interface fluids to provide liquid compositions that are compatible with the extended duration requirement for the current semiconductor product programs in particular and that have general applicability in related and further advanced microelectronic assembly programs.

Liquid compositions and preferably oil based thermal fluid compositions and, in particular, PAO oils, are provided having enhanced thermo-oxidative stability through incorporation of specially defined oxidation inhibitors/antioxidants and combinations thereof. In contrast to liquid compositions now being employed, the compositions and methods of the invention are found to maintain thermal performance to meet the extended duration requirements for current semiconductor and related microelectronic product programs.

Compositions comprising a PAO oil base fluid and a hindered phenol primary antioxidant having high molecular weight and low volatility, high melting point/high thermal stability, and in particular, Ethanox 330, have been found to show major enhancement in oxidative stability. Likewise, Ethanox 330 or other suitable hindered phenol such as Irganox 1010, used in combination with an aromatic phosphite secondary antioxidant such as Ethaphos 368 show major enhancement in oxidative stability. In another aspect the combination of the above antioxidants selected from hindered phenolic oxidation inhibitors and aromatic phosphites in conjunction with one or more aminic antioxidants, such as alkylated diphenylamine (ADPA) and n-phenyl-l-naphthylamine (PANA), provides LTI compositions with highly desirable properties for applications in even more demanding test & burn-in processes.

In a further aspect of the invention, the above compositions can be further modified by the addition of acid scavengers.

In addition to use as Liquid Thermal Interface materials, these compositions may also be employed in other filler based thermal media as thermal pastes, conductive filler dispersion vehicle, and thermal greases to provide performance improvement, particularly minimizing the paste drying problem.

Improved performance LTI compositions of the invention may be prepared by dissolving the high Mw and low volatility antioxidants into the oil such as polyalphaolefin oil, typically PAO 100, PAO 40 and lower viscosity grades.

A polyalphaolefin oil is an oil made by polymerizing an alpha olefin compound having the structure $CH_2$=CHR, wherein R is a linear or cyclic alkyl group. Typically, alpha olefin monomers are propene (R=$CH_3$), butene (R=$CH_2CH_3$), 4-methylpentene (R=$CH_2CH(CH_3)_2$), hexene (R=—$CH_2)_3CH_3$) and octene (R=$(CH_2)_5(CH_3)$. By an alpha olefin polymer is meant an alpha olefin homopolymer or copolymer. Ethene can be used for co-polymerization.

Typical polyalphaolefin oils useful herein because of their demonstrated effectiveness are PAO 100 and PAO 40, which may be defined as high viscosity olefin oligomers manufactured by ExxonMobilChemical Corp, and are known as SpectraSyn 100 and SpectraSyn 40 respectively: SpectraSyn 100 basic properties: Kinematic viscosity @100° C.=100 cST (centistokes), Molecular weight by GPC approx 2830 g/mol, pour point=−30° C., acid number=<10 mg KOH/gm. SpectraSyn 40 basic properties=kinematic viscosity= 39 cSt @100° C., Molecular weight by GPC=1680 gm/mol, pour point=−36° C.

The antioxidants used in the invention may also be used in the commercial liquid which comprises PAO 100 and 0.05% Irganox 1010 and does not interfere with the oxidation inhibitory action of the new antioxidants.

In one aspect, the new liquid compositions comprise Ethanox 330 antioxidant [1,3,5-trimethyl-2,4,6-tris(3,5-di-tert-butyl-4-hydroxybenzyl) benzene] at varying concentrations up to about 2%, or more, preferably 0.16-0.4%, by weight %, in the oil.

In a second aspect, a combination of a hindered phenol such as Ethanox 330 or Irganox 1010 with an aromatic phosphite antioxidant such as Ethaphos 368 [tris(2,4-di-tert-butylphenyl) phosphite] provides excellent results. A diphosphite such as bis-(2,4-tert-butylphenyl pentaerythritol) diphosphite may also be employed. Typically, the ratio of the phenolic:phosphite in wt % is about 1:1 to 2:1 with total concentration less than about 2%, preferably less than 1% in the oil, typically 0.16-0.4% phenolic and 0.1-0.25% phosphite.

In a third aspect, the new improved performance thermal fluid compositions of the invention comprise a combination of hindered phenolic, phosphite, and aminic antioxidants in the oil. The preferred aminic antioxidants include alkylated diphenyl amine (ADPA), preferably dioctyl diphenylamine and n-phenyl-l-naphthylamine (PANA). The aminic antioxidants are typically in an amount, by weight % in the oil, about 0.05-1%, preferably 0.05-0.15%.

In lighter synthetic oil grades such as PAO 8-25, high mp high Mw antioxidants can be dissolved at higher concentrations but the benefits reach a point of diminishing return beyond a certain point.

The preferred antioxidants because of their demonstrated effectiveness are as follows:

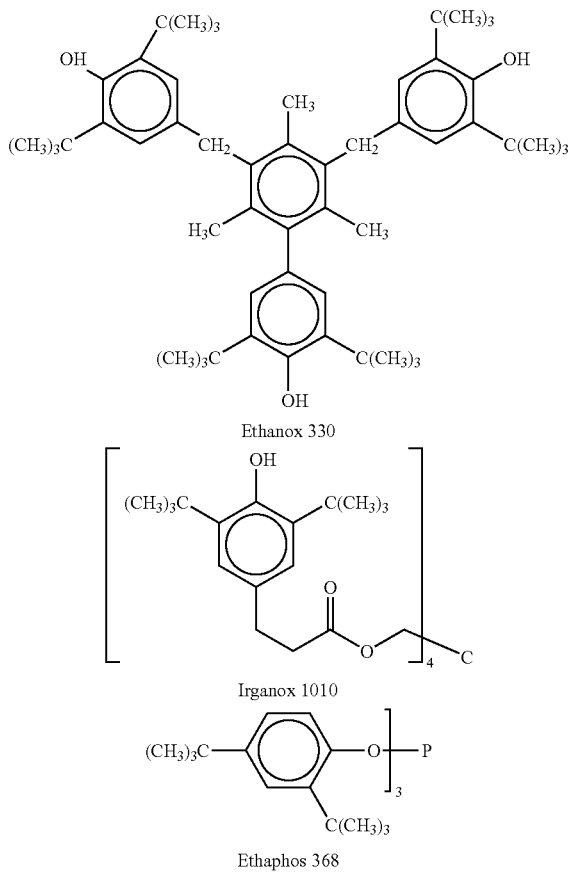

The tert-buytl groups of the above compounds may be other alkyl groups such as methyl, ethyl, propyl, isopropyl, butyl, sec-butyl, isobutyl, pentyl, isopentyl, and the like with tert-butyl being preferred because of its demonstrated effectiveness.

Preliminary evaluation of thermal stability of the compositions of the invention in air environment was carried out by isothermal TGA analysis in air at 140° C. for 144 hrs in comparison to the standard commercial composition. It was found that compositions containing Ethanox 330 at 0.16-0.35% or Ethanox 330 (or Irganox 1010) at 0.25%+Ethaphos 368 at 0.1-0.25% showed less than 1% wt loss during this time period in comparison to more than 10% weight loss observed with the commercial fluid containing only Irganox 1010.

The above liquid compositions made using the combination of hindered phenolic+phosphite with dioctyl-DPA at 0.05-0.15% showed similar enhanced results in isothermal TGA analysis as compared to the commercial composition.

In further laboratory tests for the performance assessment of these compositions with the extended burn-in duration and temperature requirement, a known amount of the liquid was dispensed on the surface of the silicon chip, covered with a second silicon piece and heated at 120° C.-140° C. in an air purged oven for 6-7 days and compared with the commercial Irganox 1010 composition as the reference material. After the thermal excursion, the silicon pieces containing the new compositions readily slid off each other with essentially no indication of high viscosity polymer formation. With the reference interface fluid, the silicon chips were stuck together and difficult to separate indicative of the viscosity build up caused by oxidative degradation of the liquid interface material.

In order to further determine the extent of resistance to oxidation conferred by the compositions of the invention, various compositions were thermally stressed at 120° C. and 140° C. in air for an extended period of time followed by GPC analysis of the stressed material in comparison to the same composition at time zero and the commercial composition. No significant change from the unstressed material in the oil peak profile and polydispersity was noted in the case of the compositions of the invention while the commercial compositions showed significant increase in polydispersity indicating presence of varying Mw species apparently resulting from oxidation/formation of reactive by-products and subsequent polymerization reactions.

In further studies to simulate the chip burn-in conditions and the contacting interface materials for extended duration die testing for current semiconductor product programs, the compositions of the invention listed above were tested on chips from 300 mm silicon wafers mounted on TCA's and chips from 200 mm silicon wafers mounted on TCA's and Sn plated Cu heatsink clamped down to provide 12-13 lb. load at the interface. The TCA/LTI/heatsink assembly is heated in air purged oven at 120° C. and 140° C. for 144 hrs. without interruption. In an alternate test matrix which better simulates the actual burn-in process, after each 24 hrs. burn-in, the thermal fluid is removed from the chip side which is then cleaned with xylene/IPA followed by fresh formulation dispense on the chip side, assembly and repeating multiple 24 hrs. heating cycles until reaching a cumulative total of 250 hrs. using the same heatsink without cleaning through the entire duration. With the compositions of the invention, no significant residue accumulation on the heatsink was observed nor was there any indication of change in the cleaning effectiveness of the die back side. These observations are consistent with the enhanced thermo-oxidative stability conferred by the unique set of antioxidants in the compositions of the invention such that formation of by-products and consequent polymerization under oxidative conditions are suppressed which markedly reduces the cleaning frequency of the heatsink, a major benefit in manufacturing to minimize down-time and reduce maintenance cost.

While the present invention has been particularly described, in conjunction with a specific preferred embodiment, it is evident that many alternatives, modifications, and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A liquid composition for use as a heat transfer interface in electronic testing such as burn-in testing and microelectronic assembly, having an enhanced thermo-oxidative stability for extended periods at elevated temperatures consisting essentially of:
    a liquid comprising polyalphaolefin oil;
    a stability enhancing combination of about 0.16-0.4% by weight of a hindered phenol of [1,3,5-trimethyl-2,4,6-tris(3,5-di-tert-butyl-4-hydroxybenzyl)benzene] in combination with about 0.1-0.25% by weight of an aromatic phosphite antioxidant of tris(2,4-di-tert-butyl phenyl)phosphite, wherein a ratio of phenol:phosphite in weight % ranges from about 1:1 to about 2:1; and
    an aminic antioxidant present in an amount of about 0.05-0.15% by weight in the polyalphaolefin oil.

2. The liquid composition of claim 1 wherein said aminic antioxidant comprises an alkylated diphenyl amine.

3. The liquid composition of claim 2 wherein said alkylated diphenyl amine comprises dioctyl diphenylamine.

4. The liquid composition of claim 1 wherein said aminic antioxidant comprises n-phenyl-l-naphthylamine.

5. A liquid composition for use as a heat transfer interface in electronic testing such as burn-in testing and microelectronic assembly, having an enhanced thermo-oxidative stability for extended periods at elevated temperatures consisting essentially of:
    a liquid comprising a polyalphaolefin oil;
    a stability enhancing combination of about 0.16-0.4% by weight of a hindered phenol of [tetrakis-(methylene-3,5-di-tert-butyl-hydroxy-hydrocinnamate)methane] in combination with about 0.1-0.25% by weight of an aromatic phosphite antioxidant of tris(2,4-di-tert-butyl phenyl)phosphite, wherein a ratio of phenol:phosphite in weight % ranges from about 1:1 to about 2:1; and
    an aminic antioxidant present in an amount of about 0.05-0.15% by weight in the polyalphaolefin oil.

6. The liquid composition of claim 5 wherein said aminic antioxidant comprises an alkylated diphenyl amine.

7. The liquid composition of claim 6 wherein said alkylated diphenyl amine comprises dioctyl diphenylamine.

8. The liquid composition of claim 5 wherein said aminic antioxidant comprises n-phenyl-l-naphthylamine.

9. The liquid composition of claim 6 wherein said alkylated diphenyl amine comprises dioctyl diphenylamine.

10. A method for testing an electronic device comprising the steps:
    providing an electronic component to be tested, the electronic component having a face;
    providing a heatsink to dissipate heat away from the surface of an electronic component, the heatsink having a face which mates with the face of the electronic component;
    providing a liquid composition between the mating surfaces consisting essentially of:
        a liquid comprising polyalphaolefin oil;
        a stability enhancing combination of about 0.16-0.4% by weight of a hindered phenol of [1,3,5-trimethyl-2,4,6-tris(3,5-di-tert-butyl-4-hydroxybenzyl)benzene], in combination with about 0.1-0.25% by weight of an aromatic phosphite antioxidant of tris(2,4-di-tert-butyl phenyl)phosphite, wherein a ratio of phenol:phosphite in weight % ranges from about 1:1 to about 2:1; and
        an aminic antioxidant present in an amount of about 0.05-0.15% by weight in the polyalphaolefin oil;
    testing the mated electronic component by stimulating the electronic component for a predetermined period of time at a predetermined voltage; and
    separating the electronic component and heatsink after the test and removing the liquid thermal interface.

11. The method of claim 10 wherein said aminic antioxidant comprises an alkylated diphenyl amine.

12. The method of claim 11 wherein said alkylated diphenyl amine comprises dioctyl diphenylamine.

13. The method of claim 10 wherein said aminic antioxidant comprises n-phenyl-l-naphthylamine.

14. A method for testing an electronic device comprising the steps:
    providing an electronic component to be tested, the electronic component having a face;
    providing a heatsink to dissipate heat away from the surface of an electronic component, the heatsink having a face which mates with the face of the electronic component;
    providing a liquid composition between the mating surfaces consisting essentially of:
        a liquid comprising a polyalphaolefin oil; and
        a stability enhancing combination of about 0.16-0.4% by weight of a hindered phenol of [tetrakis-(methylene-3,5-di-tert-butyl-hydroxy-hydrocinnamate)methane] in combination with about 0.1-0.25% by weight of an aromatic phosphite of tris(2,4-di-tert-butyl phenyl)phosphite, wherein a ratio of phenol:phosphite in weight % ranges from about 1:1 to about 2:1; and
        an aminic antioxidant present in an amount of about 0.05-0.15% by weight in the polyalphaolefin oil,
    testing the mated electronic component by stimulating the electronic component for a predetermined period of time at a predetermined voltage; and
    separating the electronic component and heat source after the test and removing the liquid.

15. The method of claim 14 wherein said aminic antioxidant comprises an alkylated diphenyl amine.

16. The method of claim 15 wherein said alkylated diphenyl amine comprises dioctyl diphenylamine.

17. The method of claim 14 wherein said aminic antioxidant comprises n-phenyl-l-naphthylamine.

18. A liquid composition for use as a heat transfer interface in electronic testing such as burn-in testing and microelectronic assembly, having an enhanced thermo-oxidative stability for extended periods at elevated temperatures consisting of:
    a liquid comprising polyalphaolefin oil;
    a stability enhancing combination of about 0.16-0.4% by weight of a hindered phenol of [1,3,5-trimethyl-2,4,6-tris(3,5-di-tert-butyl-4-hydroxybenzyl)benzene] in combination with about 0.1-0.25% by weight of an aromatic phosphite antioxidant of tris(2,4-di-tert-butyl phenyl)phosphite, wherein a ratio of phenol:phosphite in weight % ranges from about 1:1 to about 2:1; and
    an aminic antioxidant present in an amount of about 0.05-0.15% by weight in the polyalphaolefin oil.

19. The liquid composition of claim 18 wherein said aminic antioxidant comprises an alkylated diphenyl amine.

20. The liquid composition of claim 18 wherein said aminic antioxidant comprises n-phenyl-l-naphthylamine.

21. A method for testing an electronic device comprising the steps of:
    providing an electronic component to be tested, the electronic component having a face;
    providing a heatsink to dissipate heat away from the surface of an electronic component, the heatsink having a face which mates with the face of the electronic component;
    providing a liquid composition between the mating surfaces, the liquid composition consisting essentially of:
        a liquid;
        a stability enhancing combination of a hindered phenol in combination with an aromatic phosphite antioxidant; and
        an aminic antioxidant;
    testing the mated electronic component by stimulating the electronic component for a predetermined period of time at a predetermined voltage; and
    separating the electronic component and heatsink after the test and removing the liquid thermal interface.

* * * * *